US010697855B2

(12) United States Patent
Roepke (10) Patent No.: US 10,697,855 B2
(45) Date of Patent: Jun. 30, 2020

(54) METHOD AND ASSEMBLY FOR STATE MONITORING OF A BEARING THAT SUPPORTS A PLANETARY GEAR OF A PLANETARY TRANSMISSION ON A PLANET CARRIER (71) Applicant: Aktiebolaget SKF, Gothenburg (SE)

(72) Inventor: Tobias Roepke, Schweinfurt (DE)

(73) Assignee: AKTIEBOLAGET SKF, Gothenburg (SE)

(*) Notice: Subject to any disclaimer, the term of this patent is extended or adjusted under 35 U.S.C. 154(b) by 343 days.

(21) Appl. No.: 15/241,937

(22) Filed: Aug. 19, 2016

(65) Prior Publication Data
US 2017/0059449 A1 Mar. 2, 2017

(30) Foreign Application Priority Data

Aug. 28, 2015 (DE) .................. 10 2015 216 468

(51) Int. Cl.
G01C 17/38 (2006.01)
G01M 13/045 (2019.01)
(Continued)

(52) U.S. Cl.
CPC ......... *G01M 13/045* (2013.01); *F16C 19/527* (2013.01); *F16H 57/01* (2013.01);
(Continued)

(58) Field of Classification Search
CPC .... G01M 13/045; F16C 19/527; F16H 57/01; F16H 57/08; F16H 2057/012; F16H 2057/085
(Continued)

(56) References Cited

U.S. PATENT DOCUMENTS 8,812,265 B2 * 8/2014 Hedin ................... G01H 1/003
702/183
2004/0200283 A1 10/2004 Blunt
(Continued)

FOREIGN PATENT DOCUMENTS

DE 102008051175 A1 4/2010
EP 1300668 A1 4/2003
JP S57528 A 1/1982

OTHER PUBLICATIONS

VDI Report Nr. 2220 "Modellbasierte Analyse von Korperschall an Planetengetrieben von Windenergieanlagen".

Primary Examiner — Toan M Le
Assistant Examiner — Xiuqin Sun
(74) Attorney, Agent, or Firm — Garcia-Zamor Intellectual Property Law, LLC; Ruy Garcia-Zamor; Bryan Peckjian (57) ABSTRACT A method for state monitoring a bearing that supports a planetary gear of a planetary transmission on a planet carrier, the method including measuring a structure-borne noise of the planetary transmission at a stationary position on the planetary transmission in order to generate a digital measurement signal having a sample value at at least one sample time point, determining a relative speed of the planetary gear with respect to the stationary position for the sampling time point, determining a corrected measurement signal, the corrected measurement signal including the sample value with a corrected sample time point, the corrected sample time point being shifted with respect to the sample time point based on the relative speed, forming an envelope-curve signal based on the corrected measurement signal, determining a frequency spectrum for the envelope-curve signal, and comparing the frequency spectrum with a reference spectrum in a given frequency range.

11 Claims, 4 Drawing Sheets (51) Int. Cl.
*F16H 57/01* (2012.01)
*F16C 19/52* (2006.01)
*F16H 57/08* (2006.01)

(52) U.S. Cl.
CPC ...... *F16C 2233/00* (2013.01); *F16C 2361/61* (2013.01); *F16H 57/08* (2013.01); *F16H 2057/012* (2013.01); *F16H 2057/085* (2013.01)

(58) Field of Classification Search
USPC .......................................................... 702/96
See application file for complete search history.

(56) References Cited

U.S. PATENT DOCUMENTS

2005/0284225 A1 12/2005 Luo
2007/0245834 A1 10/2007 Goldfine et al.

\* cited by examiner

FIG. 5 ically reliable monitoring that the database for the analysis precisely reflects the state of the planetary transmission. Problems with respect to the analysis can occur in particular for structure-borne-noise sources that move relative to a structure-borne-noise detection position. Due to the relative movement of the structure-borne-noise source with respect to the detection position a frequency sensation of a sensor can vary at the detection position depending on the relative speed of the structure-borne-noise source. The frequency components of the structure-borne-noise source are shifted as a result of the relative movement of the sensor. This effect is known as the Doppler effect.

METHOD AND ASSEMBLY FOR STATE MONITORING OF A BEARING THAT SUPPORTS A PLANETARY GEAR OF A PLANETARY TRANSMISSION ON A PLANET CARRIER

CROSS-REFERENCE

This application claims priority to German patent application no. 10 2015 216 468.3 filed on Aug. 28, 2015, the contents of which are fully incorporated herein by reference.

TECHNOLOGICAL FIELD

Exemplary embodiments relate to a method and an assembly for state monitoring of a bearing that supports a planetary gear of a planetary transmission on a planet carrier.

State monitoring based on structure-borne noise is based on the principle of measuring changes of the noise behavior of an assembly in comparison to normal operation and drawing conclusions therefrom regarding possibly occurring damage to components of the assembly.

The operation of a planetary transmission results in the development of vibrations that propagate in the form of structure-born noise in the planetary transmission or are emitted as airborne sound to the environment. The structure-borne noise here is comprised of a variety of individual vibration components that can be matched to different transmission-parts or -components. In the event of a failure or damage the structure-borne-noise vibrations change such that with the help of vibration monitoring, transmission damage can be identified early and in a targeted manner. Wear, incorrect installation, and insufficient maintenance can be detected and evaluated.

However, it is essential for reliable monitoring that the database for the analysis precisely reflects the state of the planetary transmission. Problems with respect to the analysis can occur in particular for structure-borne-noise sources that move relative to a structure-borne-noise detection position. Due to the relative movement of the structure-borne-noise source with respect to the detection position a frequency sensation of a sensor can vary at the detection position depending on the relative speed of the structure-borne-noise source. The frequency components of the structure-borne-noise source are shifted as a result of the relative movement of the sensor. This effect is known as the Doppler effect.

Now if a bearing that supports a planetary gear of a planetary transmission on a planet carrier of the transmission is to be monitored using a stationary sensor for detection of the structure-borne noise of the planetary transmission, a shifting of the frequency components belonging to the bearing takes place in the received measurement signal. As a result of the Doppler effect the frequency increases with a movement of the planetary gear (and thus also of the bearing supporting the planetary gear) towards the sensor, or the frequency decreases with a movement of the planetary gear away from the sensor.

If the frequency spectrum for the measurement signal is now determined (for example, using Fourier transformation) then the Doppler effect effectively leads to a smearing of the frequency components of the spectrum. In particular the Doppler effect leads to reduced amplitudes in frequencies that indicate bearing damage, or their sidebands. In particular with respect to the background noise present in the spectrum it can therefore be difficult or even impossible to determine bearing defects from the smeared frequency spectrum. Particularly an automated analysis or state monitoring is often not possible due to the above-mentioned limitations.

There is therefore a need for an improved state monitoring of a bearing that supports a planetary gear of a planetary transmission on a planet carrier.

SUMMARY

Exemplary embodiments make this possible by providing a method for state monitoring of a bearing that supports a planetary gear of a planetary transmission on a planet carrier. The method comprises measuring of structure-borne noise of the planetary transmission at a stationary position on the planetary transmission in order to generate a digital measurement signal. The measurement signal here has a sample value at at least one sample time point. The digital measurement signal can have a sample value (sample) for each of a plurality of (successive) sample time points (sample time). Furthermore the method comprises determining a relative speed of the planetary gear with respect to the stationary position for the sample time point, and determining a corrected measurement signal. The corrected measurement signal has the sample value at a corrected sample time point that is shifted with respect to the sample time point depending on the relative speed. The method further comprises forming an envelope signal based on the corrected measurement signal and determining a frequency spectrum for the envelope signal. The method also comprises the comparing of the frequency spectrum with a reference spectrum in a frequency range of interest (sometimes referred to as a given frequency range).

Due to the determining of the corrected measurement signal that the sample value has at the corrected sample time point the measurement signal can be corrected for the Doppler effect. A Doppler-corrected signal in the time range is thus available for further signal analysis, from which Doppler-corrected signal the Doppler-corrected frequency spectrum can be determined for the envelope curve. A smearing of the frequency spectrum due to the Doppler effect can thus be avoided. The comparison of the determined frequency spectrum with the reference spectrum in the frequency ranges of interest thus makes possible a reliable detection of bearing damage. The proposed method therefore allows a reliable monitoring of the bearing.

In some exemplary embodiments the frequency range of interest is determined by a frequency of rotation of the planetary gear about the planet carrier and a geometry of the bearing. The geometry of the bearing is specific dimensions or characteristics of one or more components of the bearing that meaningfully contribute to the vibration behavior of the whole bearing. For example, the geometry of the bearing can be determined by a number of (e.g., spherical, conical, or cylindrical) rolling elements in the bearing, a contact angle of the rolling-element bearing with a raceway of the bearing, a pitch-circle diameter, and a diameter of the rolling elements. The frequency range of interest to be depicted can thus be determined by the bearing kinematics. Due to the determining of the frequency range of interest to be depicted, which frequency range of interest depends on the frequency of rotation of the planetary gear (and thus of the bearing) about the planet carrier and the geometry of the bearing (bearing kinematics) the frequency range of interest can be individually adapted to the bearing to be monitored. The geometry of the bearing (or bearing kinematics) here is usually known and the rotational frequency can be metrologically determined without effort, so that a frequency range of interest to be depicted can be adapted with little effort and depending on the actual operating conditions of the planetary transmission.

According to some exemplary embodiments the forming of the envelope-curve signal for the corrected measurement signal comprises band-pass filtering of the corrected measurement signal in a first frequency range that depends on at least one material of the bearing, rectification of the band-pass-filtered, corrected measurement signal, and low-pass filtering of the rectified signal in a second frequency range that exclusively includes lower frequencies than the first frequency range. Frequency components not of interest (e.g., caused by a shock-impulse response of a material or component of the planetary bearing) can be effectively removed from the envelope-curve signal by a suitable selection of the first frequency range and of the second frequency range. Likewise, further material-dependent wave-propagation characteristics of the bearing can be taken into account. In addition, materials of further parts of the planetary transmission (e.g., at the stationary position) can also be taken into account for the selection of the first frequency range in order to take into account material-dependent wave-propagation characteristics of the planetary transmission.

In some exemplary embodiments the corrected sample time point falls temporally before the sample time point for a first relative speed that indicates a movement of the planetary gear away from the stationary position. The corrected sample time point falls temporally after the sample time point for a second relative speed that indicates a movement of the planetary gear towards the stationary position. The frequency shift caused by the Doppler effect, which frequency shift is expressed in the time range by changed period lengths, can be effectively corrected or compensated for by the selected shift of the corrected sample time point relative to the sample time point. A period length between temporally successive sample values in the corrected measurement signal can be adjusted by the shift of the corrected sample time point relative to the sample time point.

According to some exemplary embodiments the frequency range of interest comprises frequencies of two times up to twenty times the frequency of rotation of the planetary gear about the planet carrier. In particular, the frequency range of interest comprises frequencies of two times up to fifteen times, of two times up to ten times, of three times up to ten times, and of four times up to nine times the frequency of rotation of the planetary gear about the planet carrier. The relevant frequency range for the frequency analysis can be limited, and thus an analysis effort can be minimized, by the above criteria.

In some exemplary embodiments the stationary position is located on a ring gear of the planetary transmission. The determining of the relative speed of the planet is effected here depending on an angle of the planetary gear to the stationary position on the ring gear relative to an axis of rotation of the planet carrier, a geometry of the planetary transmission, and a revolution frequency of the planet carrier.

The arrangement of the stationary position, for detection of the structure-borne noise, on the ring gear of the planetary transmission represents a simple-to-realize implementation for the tapping of the structure-borne noise, since the ring gear is normally fixed and offers sufficient space for a corresponding sensor. The relative speed can thereby be mathematically determined without effort via the relative angular position of the planets with respect to the stationary position. The angle is preferably determined based on the axis of rotation of the planet carrier. From the revolution frequency of the planet carrier, which can be easily measured, and the known fixed geometry of the planetary transmission (e.g., the dimensions of the ring gear, planetary gear, sun gear, or gear rations of the individual elements) a relative speed of the planetary gear with respect to the stationary position can be determined in a mathematically simple manner for any sample time point of the measurement signal. Due to the taking into account of the current revolution frequency of the planetary gear, fluctuations of the revolution speed of the planetary gear can also effectively be taken into account.

According to some exemplary embodiments a number of peaks in the frequency spectrum is determined in the range of interest. At a peak the frequency spectrum for a certain frequency or a certain frequency range has a significantly increased amplitude compared with amplitudes of adjacent frequencies or frequency ranges. For at least one peak in the frequency spectrum an amplitude and a frequency characterizing the peak are determined. The characterizing frequency can be, for example, a center frequency of the peak. Here the center frequency can be understood as the arithmetic or geometric mean of a lower limit frequency and an upper limit frequency of the peak. From the number, the amplitude (i.e., intensity) and the (frequency) position of the occurring frequency components conclusions can possibly be made regarding specific types of damage in the bearing, since different bearing damage types each generate typical components in the frequency spectrum. A pattern of the damage frequencies can thus be determined.

In some exemplary embodiments a frequency spectrum is respectively determined for successive time points. Furthermore a change of the amplitude and of the characteristic frequency is determined for the at least one peak between the successive time points. By determining frequency spectra for successive time points a development of damage of the bearing can be observed. The observing of the amplitude- and frequency-development of the occurring peaks can make possible a very exact determining of the current degree of damage of the bearing. Accordingly a very precise statement about a remaining service life of the bearing or of measures to be taken (e.g., replacement of the bearing) can possibly be made. Alternatively or additionally, in further exemplary embodiments a change of the number of peaks in the frequency range of interest between the successive time points can be determined. Further conclusions about the state of the bearing can be drawn from the development of the number of peaks. A development of the pattern of damage frequencies can thus be observed and assessed.

Exemplary embodiments furthermore relate to an assembly for state monitoring of a bearing that supports a planetary gear of a planetary transmission on a planet carrier. Here the assembly comprises a sensor at a stationary position on the planetary transmission, which sensor is configured to measure structure-borne noise of the planetary transmission in order to generate a digital measurement signal. Here the measurement signal has a sample value at at least one sample time point. Furthermore, the assembly comprises a signal-processing device that is coupled with the sensor. Here the digital measurement signal can in particular be generated by the signal-processing device from an analog measurement signal that is provided by the sensor. Alternatively the sensor can provide the digital measurement signal. Here the signal-processing device is configured to determine a relative speed of the planetary gear with respect to the sensor for the sample time point and to determine a corrected measurement signal. Here the corrected measurement signal has the sample value at a corrected time point, which is shifted with respect to the sample time point depending on the relative speed. Furthermore, the signal-processing device is configured to form an envelope-curve signal based on the corrected measurement signal and to form a frequency spectrum for the envelope-curve signal. The signal-processing device is furthermore configured to compare the frequency spectrum with a reference spectrum in a frequency range of interest.

Due to the determining of the corrected measurement signal that the sample value has at the corrected sample time point the measurement signal can be corrected for the Doppler effect. For the further signal analysis the signal-processing device thus provides a Doppler-corrected signal in the time range, from which the Doppler-corrected frequency spectrum for the envelope curve can be determined. The comparison of the determined frequency spectrum with the at least one frequency spectrum in the range of interest makes possible an additional detection of bearing damage. The proposed assembly therefore allows a reliable monitoring of the bearing.

In some exemplary embodiments the frequency range of interest is determined by a frequency of rotation of the planetary gear about the planet carrier and a geometry of the bearing. The frequency range of interest depicted can thus be determined by the bearing kinematics. Due to the determining of the depicted frequency range of interest depending on the frequency of rotation of the planetary gear (and thus of the bearing) about the planet carrier and the geometry of the bearing (bearing kinematics) the depicted frequency range of interest can be individually adapted to the bearing to be monitored. The geometry of the bearing (or bearing kinematics) here is usually known and the frequency of rotation can be metrologically determined without effort, so that the frequency range of interest can be adapted with little effort and depending on the actual operating conditions of the planetary transmission.

According to some exemplary embodiments the sensor is disposed on a ring gear of the planetary transmission. Here the assembly comprises a further sensor, which is configured to determine an angle of the planetary gear to the stationary position of the sensor on the ring gear based on an axis of rotation of the planet carrier. Here the signal-processing device is configured to determine the relative speed of the planet with respect to the sensor depending on the angle determined by the further sensor, a geometry of the planetary transmission, and a revolution frequency of the planet carrier.

The arrangement of the sensor on the ring gear of the planetary transmission represents a simple-to-realize implementation for the tapping of the structure-borne noise, since the ring gear is usually fixed and offers sufficient space for the sensor. The relative speed can thereby be determined without effort via the relative angular position of the planetary gear with respect to the sensor. From the revolution frequency of the planet carrier, which is easily measured using the further sensor, and the known fixed geometry of the planetary transmission a relative speed of the planetary gear with respect to the sensor can be determined in a simple manner for each sample time point of the measurement signal.

In some exemplary embodiments the frequency range of interest comprises frequencies from two times up to twenty times the frequency of rotation of the planetary gear about the planet carrier. In particular, the frequency range of interest comprises frequencies of two times up to fifteen times, of two times up to ten times, of three times up to ten times, and of four times up to nine times the frequency of rotation of the planetary gear about the planet carrier. The relevant frequency range for the frequency analysis can be limited, and thus an analysis effort can be minimized, by the above criteria. Due to the taking into account of the current revolution frequency of the planetary gear, fluctuations of the revolution speed of the planetary gear can also effectively be taken into account.

BRIEF DESCRIPTION OF THE DRAWINGS

Preferred exemplary embodiments of the present invention are explained in more detail below, referring to the included Figures.

DETAILED DESCRIPTION

Figure 1:
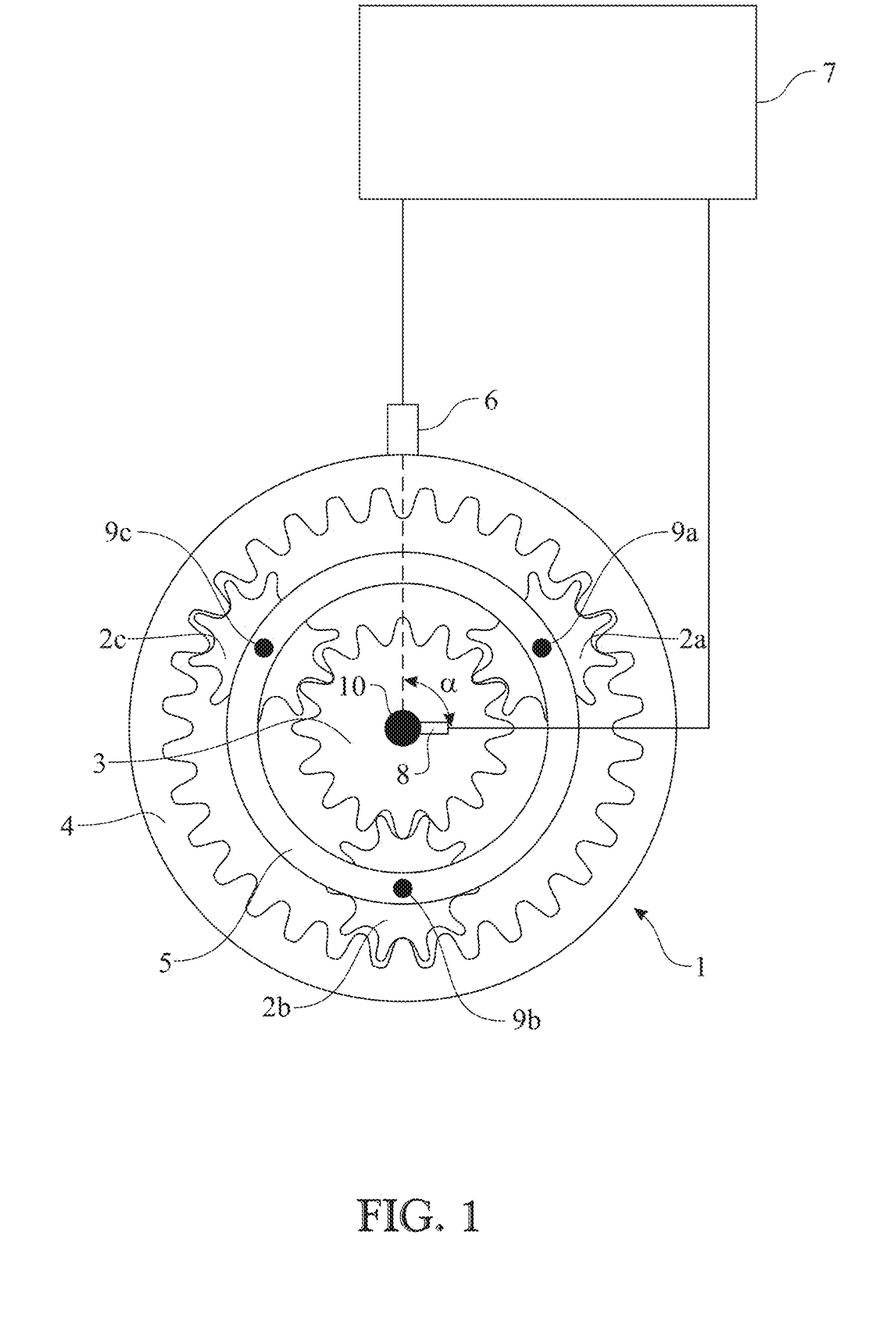
FIG. 1 shows a schematic depiction of a planetary transmission and an assembly for state monitoring of a bearing that supports a planetary gear of the planetary transmission, according to an exemplary embodiment.

A to-be-monitored planetary transmission 1 is shown in FIG. 1. The planetary transmission 1 includes a ring gear 4 and a sun gear 3. A first planetary gear 9a, a second planetary gear 9b, and a third planetary gear 9c are disposed in engagement with the sun gear 3 and the ring gear 4. The planetary gears 9a, 9b, 9c are each supported via a bearing (planet bearing) 2a, 2b, 2c on a planet carrier 5. The planetary gears 9a, 9b, 9c revolve relative to the ring gear 4 in order to thus drive the sun gear 3.

The bearings 2a, 2b, 2c can have or develop defects both from the start onward, due to incorrect installation, or in the course of their use. For example, outer-ring defects or inner-ring defects can occur. Here it can be, for example, a material fracture or a micro-fissure formation near the surface on a raceway of the respective bearing ring. These defects are also known as pittings and with increasing damage progression can develop to a comprehensive spalling of the raceway of the bearing. Such defects can be recognized or monitored using an analysis of the structure-borne noise of the planetary transmission 1 according to exemplary embodiments.

In the following a monitoring of the first planetary gear 9a is described for purely illustrative purposes. However, each of the planetary gears 9a, 9b, 9c can be monitored according to exemplary embodiments. The present exemplary embodiments are also not limited to planetary transmissions that, as shown in FIG. 1, include three planetary gears (and thus at least three planet bearings). Rather, the present exemplary embodiments can be used for monitoring planetary transmissions with any number of planetary gears (e.g., 2, 3, 4, 5, 6, 8, 10 or more planetary gears).

A sensor 6 is disposed on an outer circumferential surface of the ring gear 4. Here the sensor 6 is configured to measure structure-borne noise of the planetary transmission 1. For this purpose the sensor 6 can comprise, for example, a piezoelectric converter, which is configured to convert accelerations at a contact surface of the sensor (e.g., the outer circumferential surface of the ring gear 4) into an electrical signal. Alternatively or additionally the sensor 6 can furthermore include a microphone (e.g., a MEMS (microelectromechanical systems) microphone) in order to tap (intercept or pick up) the structure-borne noise. The sensor 6 is fixedly disposed on the ring gear 4. However, the position of the sensor 6 here is not limited to the 12 o'clock position shown in FIG. 1 (in analogy to the possible positions of a clock hand). Rather, the sensor 6 can be disposed at any position on the ring gear 4. A digital measurement signal is generated from the structure-borne noise measured from the sensor 6. Here the measurement signal has a sample value for at least one sample time point. In particular, the measurement signal can have a sample value for each of a plurality of successive sample time points.

The sensor 6 is connected with a signal-processing device 7 and provides the digital measurement signal to it. In alternative embodiments the sensor 6 can provide an analog measurement signal to the signal-processing device, which analog measurement signal is converted into the digital measurement signal (analog-digital conversion) by the signal-processing device 7. The signal-processing device 7 can be, for example, a part of a monitoring device for the planetary transmission. However, the signal-processing device 7 can also be a stand-alone unit. The signal-processing device 7 can comprise one or more computing units, e.g., processors or microprocessors in order to process the measurement signal and further signals. In particular, the one or more computing units are configured to carry out one or more predetermined operations, which can be provided, for example, in the form of a program code on an external or internal storage of the signal-processing device 7.

In particular, the signal-processing device 7 is configured to determine a relative speed of the first planetary gear 9*a* relative to the stationary position of the sensor 6 for the sample time point. For this purpose the assembly includes a further sensor 8, which is formed to determine an angle α of the first planetary gear 9*a* to the stationary position on the ring gear 4 based on an axis of rotation 10 of the planet carrier 5. For example, the further sensor 8 can be embodied as a keyphasor or trigger, which detects a passage of a control point on the axis of rotation 10 of the planet carrier 5 through a stationary measuring point.

From the known (fixed) position of the planetary gear 9*a* with respect to the control point and the revolution speed or revolution frequency of the planet carrier 5 (or of the axis of rotation 10) the relative angle α between the sensor 6 and the first planetary gear 9*a* can be determined for each sample time point. With a known revolution frequency of the planet carrier 5 the signal-processing device 7 can determine a relative speed of the planetary gear 9*a* with respect to the sensor 6 using the geometry (e.g., dimensions of ring gear 4, first planetary gear 9*a*, and sun gear 3) of the planetary transmission 1. For example, the signal-processing device 7 can include a precomputed table wherein with specified revolution frequency the relative speeds of the first planet gear 9*a* with respect to the sensor 6 are obtained for different angles α. For the sample time point of the sample value of the measurement signal the signal-processing device 7 can determine from the angle α and the relative speed stored (in the table) for the angle α, with little computational effort, the relative speed of the first planetary gear 9*a* with respect to the stationary position of the sensor. Alternatively the signal-processing device 7 can also calculate the relative speed for the sample time point outright, i.e., without use of the table.

The signal-processing device 7 is furthermore configured to determine a corrected measurement signal. For this purpose the signal-processing device determines a corrected sample time point for the sample value of the measurement signal. The corrected sample time point here is dependent on the relative speed with respect to the sample time point.

The corrected sample time point falls, for example, temporally before a first relative speed if the first relative speed indicates a movement of the planetary gear 9*a* away from the stationary position of the sensor 6. The corrected sampling time falls temporally after the sample time point for a second relative speed if the second relative speed indicates a movement of the planetary gear 9*a* towards the stationary position of the sensor 6. The frequency shift caused by the Doppler effect, which frequency shift is expressed in the time range by changed period lengths, can be effectively corrected or compensated for by the selected shift of the corrected sample time point relative to the sample time point. In the frequency spectrum this corresponds to a correction of the Doppler-shafted frequency according to the following expression:

$$f_{corr} = f_{doppler} * \left(1 - \frac{v_{rel}}{c}\right),$$

wherein $f_{corr}$ indicates the frequency corrected for the Doppler effect, $f_{doppler}$ the Doppler-shifted frequency, $v_{rel}$ the relative speed of the first planetary gear 9*a* with respect to the stationary position of the sensor 6, and c the sound propagation speed in the planetary transmission 1.

The signal-processing device 7 is furthermore configured to determine an envelope-curve signal for the corrected measurement signal. The envelope-curve signal represents the enveloping of the corrected measurement signal. In particular, the formation of the envelope-curve signal comprises a band-pass filtering of the corrected measurement signal, a rectifying of the band-pass-filtered signal, and a low-pass filtering of the rectified signal. Natural frequencies of the planetary transmission 1 can be effectively filtered out by the envelope-curve formation. The envelope-curve signal thus makes possible the extraction of the frequency components in the frequency spectrum, which frequency components are caused by the bearing damage of the first bearing 2*a*.

Furthermore, the signal processing device 7 is configured to determine a frequency spectrum (envelope-curve spectrum) of the envelope-curve signal. For this purpose the signal-processing device 7 can use, for example, the mathematical method of Fourier transformation on the envelope-curve signal. From the frequency spectrum the signal-processing device 7 can recognize bearing damage of the bearing 2*a* by comparison with at least one reference spectrum in a frequency range of interest. Here the frequency range of interest is determined by a frequency of rotation of the first planetary gear 9*a* about the planet carrier 5 and a geometry (bearing kinematics) of the bearing 2*a*. In particular the frequency range of interest can comprise frequencies of three times up to ten times or of four times up to nine times the rotational frequency of the planetary gear 9*a* about the planet carrier 5. The relevant frequency range for the frequency analysis can be effectively limited, and thus a computing effort of the signal-processing device 7 can be minimized, by the above criteria.

The signal-processing device 7 can be further configured to determine a number of peaks in the frequency spectrum in the range of interest. For one or more (in particular all) peaks the signal-processing device can determine an amplitude and a frequency characterizing the peak. From the number, the amplitude (i.e., intensity) and the (frequency) position of the occurring frequency components conclusions can possibly be made regarding specific types of damage in the bearing, since different bearing damage types each generate typical components in the frequency spectrum. A pattern of damage frequencies can thus be determined.

In particular, the signal-processing device 7 can be configured to determine a frequency spectrum for each of successive time points and determine a progression, i.e., a changing, of the amplitudes, the positions (characterizing frequency), and the number of frequency components (peaks) occurring. By determining frequency spectra for successive time points a development of damage of the first bearing 2a can be observed. For example, bearing damage can express itself by initial small amplitudes of the defect frequencies, which increase in their intensity with increasing extent of the damage. This can apply, for example, for pittings in the raceways of the first bearing 2a. The amplitudes of the defect frequencies decrease and turn into a noise. The observing of number, intensity (amplitude) and position of the frequency components can therefore possibly make possible a very exact determining of the current degree of damage of the first bearing 2a. Accordingly a very precise statement about a remaining service life of the bearing 2a or about measures to be taken (e.g., replacement of the bearing 2a) can be made.

Figure 2:
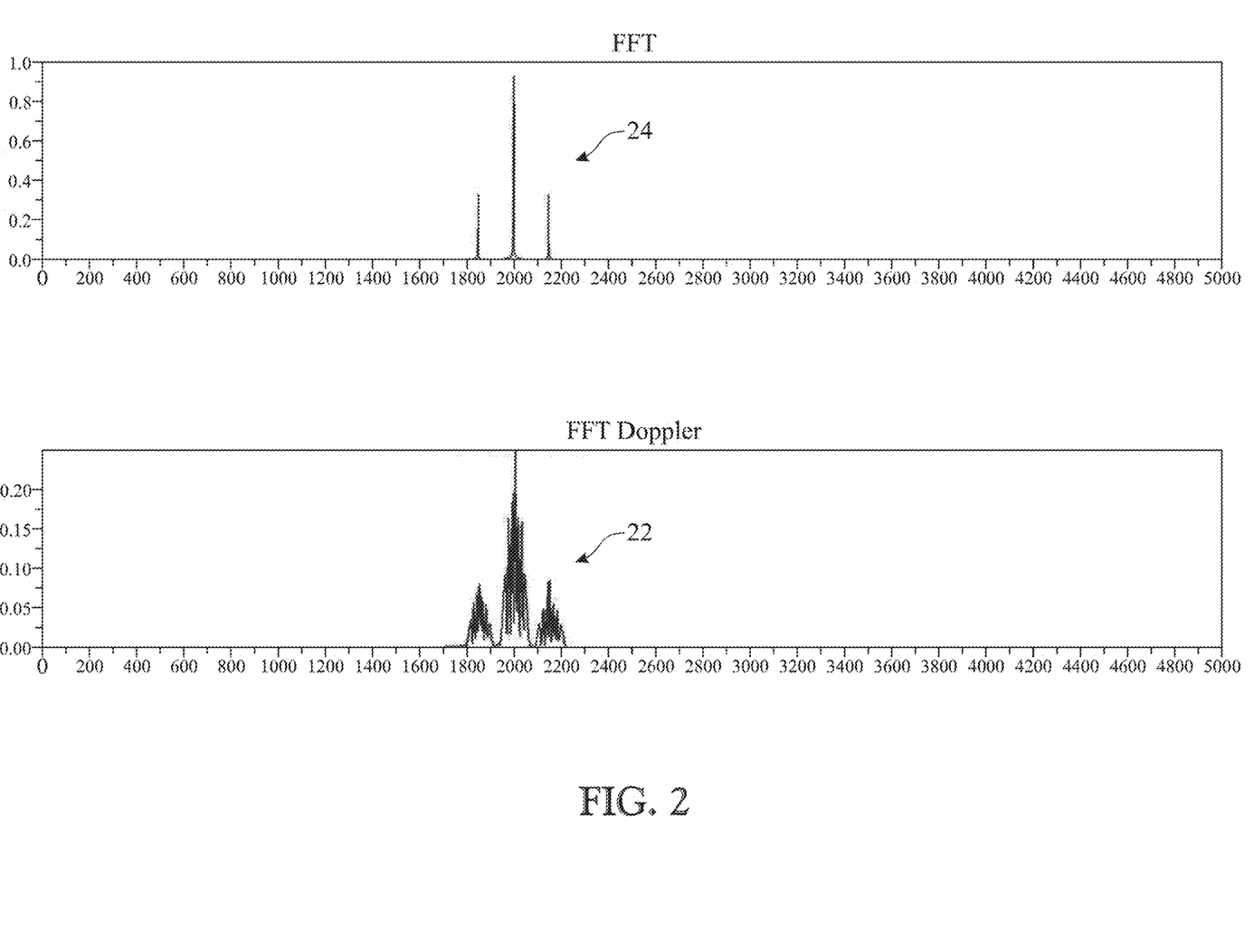
FIG. 2 shows a Doppler-corrected and not-Doppler-corrected frequency spectrum.

In its upper half FIG. 2 shows an example of a Doppler-corrected frequency spectrum 21 that is determined according to an exemplary embodiment from a measurement signal. Here the abscissa indicates the frequency in hertz (Hz) while the ordinate indicates an amplitude of the signal with the respective frequency in arbitrary units. In frequency spectrum 22 three narrow, almost linear peaks are recognized at approximately 1850 Hz, 2000 Hz, and 2150 Hz. The peaks have maximum amplitudes between approx. 0.4 and approx. 0.9.

For comparison a not-Doppler-corrected frequency spectrum 22 is shown in the lower half of FIG. 2. The frequency spectrum 22 also has three peaks whose center frequencies fall at approximately 1850 Hz, 2000 Hz, and 2150 Hz. However, in contrast to the narrow peaks of the Doppler-corrected frequency spectrum 21 the peaks of the not-Doppler-corrected frequency spectrum 22 are greatly widened, i.e., they each extend over a larger frequency range. In addition, the maximum amplitudes of the not-Doppler-corrected frequency spectrum 22, with values between approximately 0.075 and approximately 0.25, are greatly reduced compared to the maximum amplitudes of the Doppler-corrected frequency spectrum 21.

As mentioned above, the widening of the peaks is a consequence of the Doppler effect caused by the relative movement of the planetary gear. Due to the Doppler effect the narrow peaks with high amplitude are smeared to wide peaks with greatly reduced amplitude. The frequency spectra shown in FIG. 2 are idealized spectra wherein no background noise is depicted. However in real frequency spectra a background noise is always to be observed so that the reduced signal amplitudes of the not-Doppler-corrected frequency spectrum 22 can be low such that they can only be separated with difficulty, or not at all, from the background noise. Accordingly the state monitoring of a bearing that supports a planetary gear on a planet carrier can be more difficult or impossible. This problem can be avoided by the Doppler correction according to exemplary embodiments and a reliable state monitoring of the bearing can be ensured.

Figure 3:
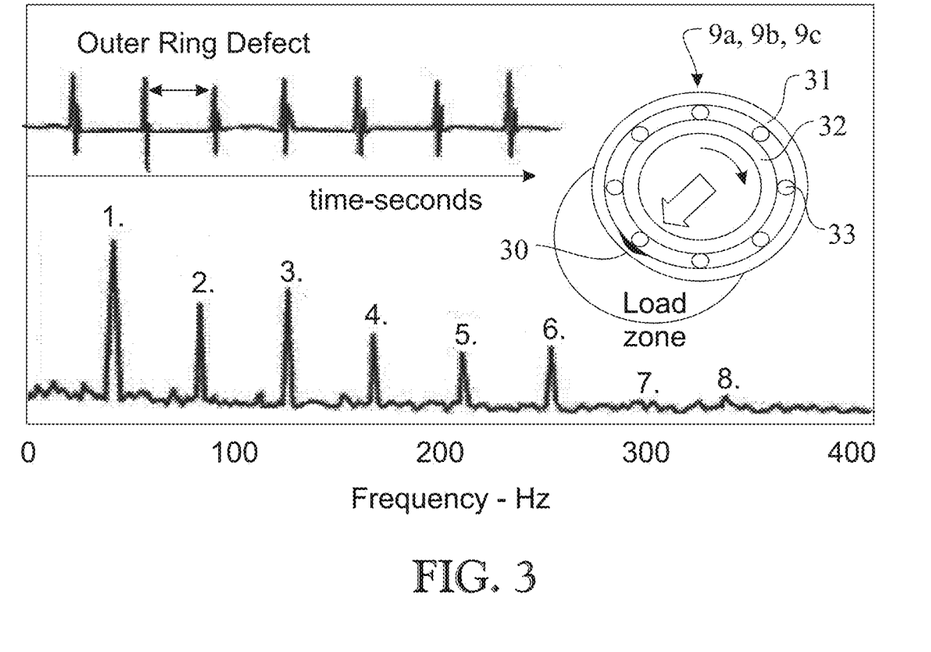
FIG. 3 shows an example of a measurement signal and of a resulting frequency spectrum for an outer-ring defect with rotating inner ring.

FIG. 3 shows in an overview an example of a temporal progression of a measurement signal for an outer-ring defect 30 of the bearing 9a, 9b, 9c as well as the frequency spectrum resulting therefrom.

Here in FIG. 3 a situation is illustrated wherein an outer ring 31 of the bearing 9a, 9b, 9c is fixed and an inner ring 32 rotates relative to the outer ring 31 via rolling elements 33. The outer ring 31 here has an outer-ring defect 30.

As mentioned above the outer-ring defect 30 can be, for example, a material fracture or a micro-fissure formation near the surface on a raceway of the outer ring 33 of the bearing 9a, 9b, 9c. The outer-ring defect 30 is located in the region of the load zone of the bearing 9a, 9b, 9c.

In the temporal progression of the measurement signal shown in the upper region of FIG. 3 regularly occurring deflections of the signal amplitude are recognized. The regularity of the deflections results from the regular over-rolling of the outer-ring defect 30 by the rolling elements 33.

The frequency spectrum shown in the lower region of FIG. 3 therefore includes uniformly spaced peaks (1 to 8) in addition to the background noise. The peaks occur with an outer-ring defect 30, for example, in a frequency range that comprises frequencies of multiples from four times to eight times the frequency of rotation of the bearing 9a, 9b, 9c.

Figure 4:
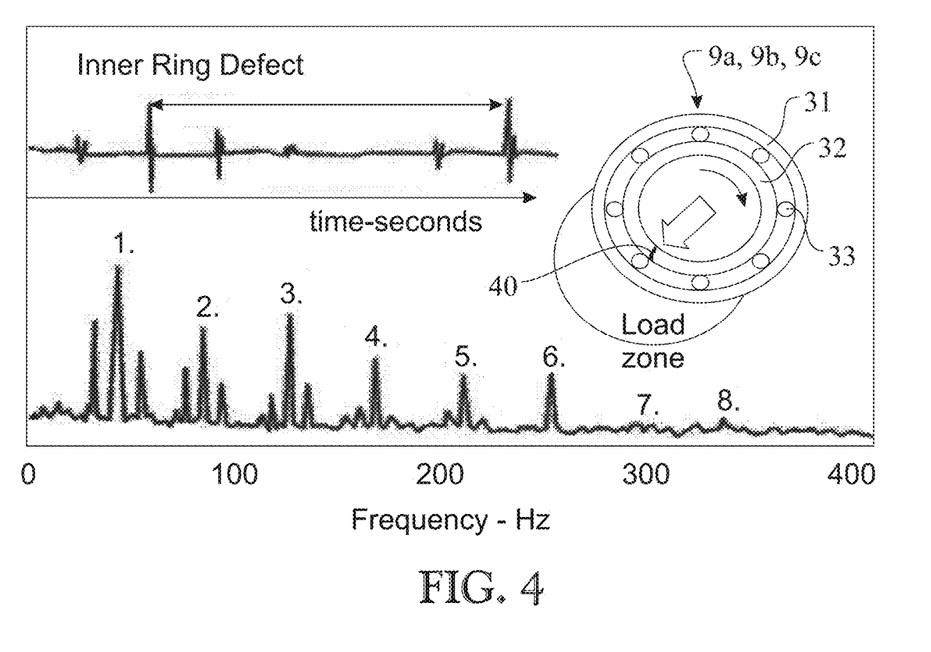
FIG. 4 shows an example of a measurement signal and of a resulting frequency spectrum for an inner ring defect with rotating inner ring.

FIG. 4 shows in an overview an example of a temporal progression of a measurement signal for an inner-ring defect 40 of a bearing 9a, 9b, 9c as well as the frequency spectrum resulting therefrom.

FIG. 4 here shows a similar situation as in FIG. 3, however the inner ring 32 of the bearing 9a, 9b, 9c has the inner-ring defect 40, and the outer ring 31 is defect-free.

In turn in the upper region of FIG. 4 the temporal course of the measurement signal is shown. It is recognized that for the outer-ring defect 40 no regular deflections of the signal amplitude occur as in FIG. 3. Rather, high signal amplitudes only occur if the inner-ring defect 30 passes the load zone—as a result of the rotating of the inner ring. The inner-ring defect 30 is de facto modulated with the frequency of rotation of the bearing. Further deflections with small signal amplitudes occur as a result of the over-rolling of the inner-ring damage by the rolling elements 33.

In the frequency spectrum shown in the lower region of FIG. 4 peaks (1 to 8) are recognized as well as sidebands of the peaks. The peaks occur with an inner-ring defect 40, for example, in a frequency range that comprises frequencies of five times to nine times the frequency of rotation of the bearing 9a, 9b, 9c.

A reliable statement about damage to a bearing 9a, 9b, 9c can be made by analysis of number, position, intensity, and change of the peaks in a frequency spectrum (e.g., shown in FIG. 3 and FIG. 4) obtained from a measurement signal according to exemplary embodiments. On this basis further measures can be decided on, for example, such as, for example, the replacing of the bearing.

Figure 5:
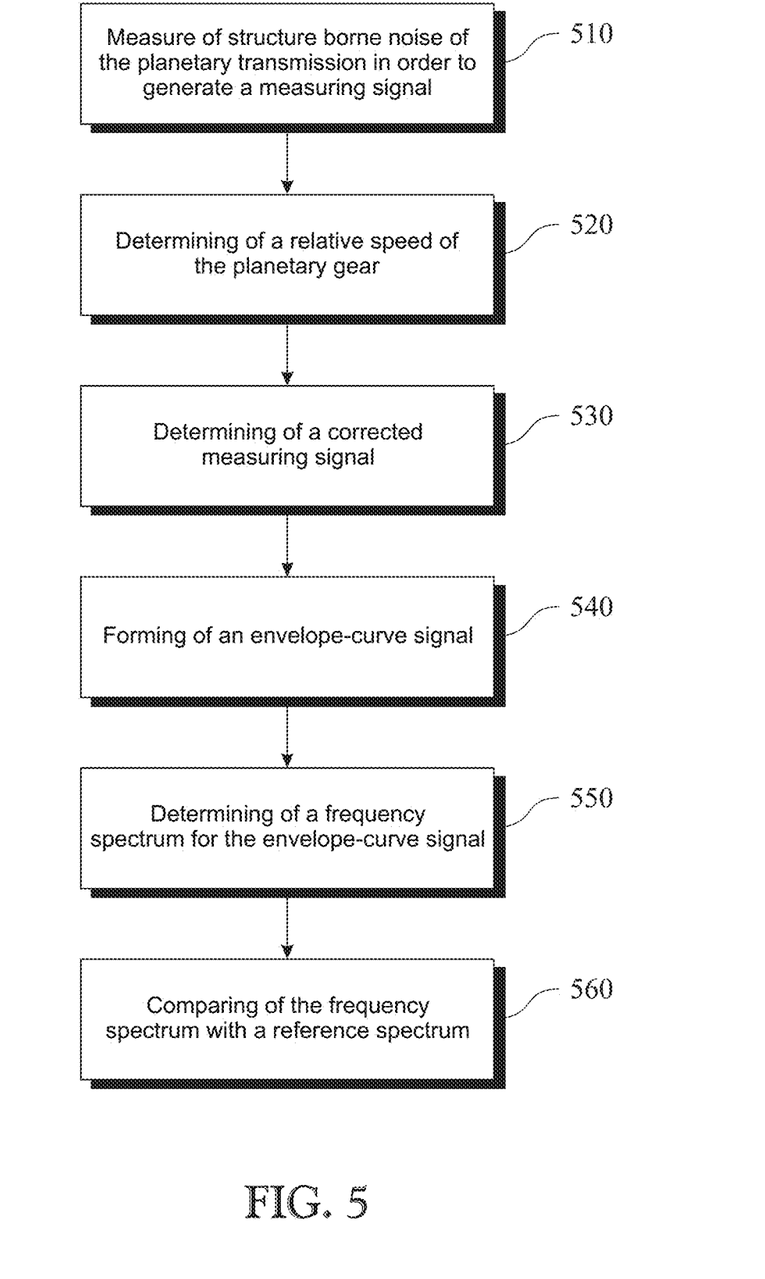
FIG. 5 shows a method for state monitoring of a bearing that supports a planetary gear of a planetary transmission on a planet carrier, according to an exemplary embodiment.

FIG. 5 shows an exemplary embodiment of a method 500 for state monitoring of a bearing that supports a planetary gear of a planetary transmission on a planet carrier.

The method 500 comprises measuring 510 of structure-borne noise of the planetary transmission at a stationary position on the planetary transmission in order to generate a digital measurement signal, wherein the measurement signal has a sample value at at least one sample time point. Furthermore the method 500 comprises determining 520 of a relative speed of the planetary gear relative to the stationary position for the sample time point. In a further step the method 500 comprises determining 530 of a corrected measurement signal, wherein the corrected measurement signal includes the sample value with a corrected sample time point, which is shifted with respect to the sample time point depending on the relative speed. The method 500 furthermore comprises forming 540 of an envelope-curve signal based on the corrected measurement signal and determining 550 of a frequency spectrum for the envelope-curve signal. The method 500 further comprises comparing 560 of the frequency spectrum with a reference spectrum in a frequency range of interest. The frequency range of interest can be determined in particular by a frequency of rotation of the planetary gear about the planet carrier and a geometry of the bearing.

Further details and aspects of the method are described above in connection with one or more exemplary embodiments. The method can comprise one or more optional features according to one or more of the previously described exemplary embodiments.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved state monitoring of bearings in planetary gear systems or other movable bearings.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

1 Planetary transmission
2a First planetary gear
2b Second planetary gear
2c Third planetary gear
3 Sun gear
4 Ring gear
5 Planet carrier
6 Sensor
7 Signal-processing device
8 Further sensor
9a First bearing
9b Second bearing
9c Third bearing
10 Axis of rotation of the planet carrier
21 Doppler-corrected frequency spectrum
22 Not-Doppler-adjusted frequency spectrum
30 Outer-ring defect
31 Outer ring
32 Inner ring
33 Rolling elements
40 Inner-ring defect

What is claimed is:

1. A method for state monitoring of a bearing that supports a planetary gear of a planetary transmission on a planet carrier, the method comprising:
   measuring a structure-borne noise of the planetary transmission at a stationary position on the planetary transmission in order to generate a digital measurement signal, wherein the digital measurement signal has a sample value at a sample time point;
   determining a relative speed of the planetary gear with respect to the stationary position for the sample time point;
   determining a corrected measurement signal, wherein the corrected measurement signal includes the sample value with a corrected sample time point, the corrected sample time point being shifted to compensate for a Doppler effect frequency shift with respect to the sample time point based on the relative speed;
   forming an envelope-curve signal based on the corrected measurement signal;
   determining a frequency spectrum for the envelope-curve signal; and
   comparing the frequency spectrum with at least one reference spectrum in a given frequency range, wherein the given frequency range is based on a frequency of rotation of the planetary gear about the planet carrier, and on a geometry of the bearing,
   wherein the corrected sample time point falling temporally before the sample time point for a first relative speed indicates a movement of the planetary gear away from the stationary position, and the corrected sample time point falling temporally after the sample time point for a second relative speed indicates a movement of the planetary gear towards the stationary position.

2. The method according to claim 1, wherein forming the envelope-curve signal for the corrected measurement signal comprises:
   band-pass filtering the corrected measurement signal in a first frequency range that depends on at least one material of the bearing;
   rectifying the band-pass-filtered corrected measurement signal; and
   low-pass filtering the rectified signal in a second frequency range that exclusively includes lower frequencies than the first frequency range.

3. The method according to claim 1, wherein the given frequency range comprises frequencies of three times to ten times the frequency of rotation of the planetary gear about the planet carrier.

4. The method according to claim 1, wherein the stationary position is located on a ring gear of the planetary transmission and wherein the determining the relative speed of the planetary gear is effected based on an angle of the planetary gear to the stationary position on the ring gear relative to an axis of rotation of the planet carrier, a geometry of the planetary transmission, and a revolution frequency of the planet carrier.

5. The method according to claim 1, wherein the number of peaks in the frequency spectrum in the given frequency range is determined and for at least one peak an amplitude and a frequency characterizing the peak is determined.

6. The method according to claim 5, wherein a characterizing frequency spectrum is determined for at least two successive points in time and wherein a change of an amplitude of the characterizing frequency is determined for at least one peak of the characterizing frequency spectrum between the successive time points.

7. The method according to claim 1,
wherein forming the envelope-curve signal for the corrected measurement signal comprises:
band-pass filtering the corrected measurement signal in a first frequency range that depends on at least one material of the bearing;
rectifying the band-pass-filtered corrected measurement signal; and
low-pass filtering the rectified signal in a second frequency range that exclusively includes lower frequencies than the first frequency range,
wherein the corrected sample time point falls temporally before the sample time point for a first relative speed that indicates a movement of the planetary gear away from the stationary position, and the corrected sample time point falls temporally after the sample time point for a second relative speed that indicates a movement of the planetary gear towards the stationary position,
wherein the given frequency range comprises frequencies of three times to ten times the frequency of rotation of the planetary gear about the planet carrier,
wherein the stationary position is located on a ring gear of the planetary transmission and wherein the determining the relative speed of the planetary gear is effected based on an angle of the planetary gear to the stationary position on the ring gear relative to an axis of rotation of the planet carrier, a geometry of the planetary transmission, and a revolution frequency of the planet carrier,
wherein the number of peaks in the frequency spectrum in the given frequency range is determined and for at least one peak an amplitude and a frequency characterizing the peak is determined, and
wherein a characterizing frequency spectrum is determined for at least two successive points in time and wherein a change of an amplitude of the characterizing frequency is determined for at least one peak of the characterizing frequency spectrum between the successive time points.

8. An assembly for state monitoring a bearing that supports a planetary gear of a planetary transmission on a planet carrier, comprising:
a sensor at a fixed position on the planetary transmission, the sensor being configured to measure structure-borne noise of the planetary transmission in order to generate a digital measurement signal, wherein the measurement signal has a sample value at a sample point; and
a signal-processing device that is coupled with the sensor, wherein the signal-processing device is configured:
to determine a relative speed of the planetary gear with respect to the sensor for the sample time point;
to determine a corrected measurement signal, wherein the corrected measurement signal includes the sample value with a corrected sample time point, which is shifted to compensate for a Doppler effect frequency shift with respect to the sample time point depending on the relative speed;
to form an envelope-curve signal based on the corrected measurement signal;
to form a frequency spectrum for the envelope-curve signal; and
to compare the frequency spectrum with at least one reference spectrum in a given frequency range, wherein the given frequency range is determined by a frequency of rotation of the planetary gear about the planet carrier, and a geometry of the bearing,
wherein the corrected sample time point falling temporally before the sample time point for a first relative speed indicates a movement of the planetary gear away from the stationary position, and the corrected sample time point falling temporally after the sample time point for a second relative speed indicates a movement of the planetary gear towards the stationary position.

9. The assembly according to claim 8,
wherein the sensor is disposed on a ring gear of the planetary transmission,
wherein the assembly comprises a further sensor, which is configured to determine an angle of the first planetary gear to the stationary position of the sensor on the ring gear based on an axis of rotation of the planet carrier, and
wherein the signal-processing device is configured to determine the relative speed of the planetary gear with respect to the sensor depending on the angle determined by the further sensor, a geometry of the planetary transmission, and a revolution frequency of the planet carrier.

10. The assembly according to claim 9, wherein the given frequency range comprises frequencies from three times to ten times the frequency of rotation of the planetary gear about the planet carrier.

11. The assembly according to claim 8, wherein the given frequency range comprises frequencies from three times to ten times the frequency of rotation of the planetary gear about the planet carrier.

* * * * *